United States Patent Office 3,461,163
Patented Aug. 12, 1969

3,461,163
SYNTHESIS OF DIMETHYL DIALLYL
AMMONIUM CHLORIDE
Jerry E. Boothe, Pittsburgh, Pa., assignor, by mesne assignments, to Calgon Corporation, a corporation of Delaware
No Drawing. Filed Mar. 16, 1967, Ser. No. 623,558
Int. Cl. C07c 85/04, 87/46; C08f 3/86
U.S. Cl. 260—567.6          15 Claims

ABSTRACT OF THE DISCLOSURE

A process for the synthesis of high purity dimethyl diallyl ammonium chloride is disclosed. The dimethyl diallyl ammonium chloride is prepared from allyl chloride, dimethyl amine and inorganic alkalies. Greatly increased purity may be obtained in the final product if a low allyl chloride concentration and a high dimethyl amine concentration are maintained for as long as possible during the reaction, while, at the same time, maintaining the pH within the range of 12 to 14. The pure dimethyl diallyl ammonium chloride may be polymerized to much higher molecular weight polymers than the prior art impure monomers could produce.

BACKGROUND OF THE INVENTION

Di(lower)alkyl diallyl ammonium chlorides are known compounds which may be prepared from the reaction of a di(lower)alkyl amine with an allyl chloride in the presence of an inorganic alkali such as sodium hydroxide. The prior art has used a process comprising adding a molecular equivalent of the allyl chloride to a molecular equivalent of an aqueous solution of the di(lower)alkyl secondary amine. A molecular equivalent of the alkali is then added under refluxing conditions. The solution is allowed to stand for an appreciable length of time, for example, 16 hours, and then two additional equivalents of the allyl chloride are added with refluxing of the resultant mixture for 5 to 15 hours. The synthesis reaction is considered complete when the pH has dropped below 5, and di(lower)alkyl diallyl ammonium chloride is recovered.

It has now been found, however, that the dimethyl diallyl ammonium chloride produced by such prior art processes contains undesirable impurities and that the polymers prepared therefrom have undesirably low molecular weights. For example, high molecular weight dimethyl diallyl ammonium chloride polymers have exhibited outstanding utility as flocculants for water and sewerage treatment. However, the impure monomers produced by the prior art cannot be polymerized to polymers of high enough molecular weights to be used as flocculants.

OBJECTS OF THE INVENTION

It is an object of this invention to provide an improved process for the synthesis of dimethyl diallyl ammonium chloride of increased purity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

It has now been found that very pure dimethyl diallyl ammonium chloride can be prepared from allyl chloride, dimethyl amine and inorganic alkalies by maintaining a low allyl chloride concentration and a high dimethyl amine concentration for as long as possible during the reaction, while at the same time maintaining a pH within the range of 12 to 14.

DESCRIPTION OF THE INVENTION

Dimethyl diallyl ammonium chloride is prepared from one mole of dimethyl amine, two moles of allyl chloride and one mole of an inorganic alkali, for instance, sodium hydroxide, by the following equation:

$(CH_3)_2NH + 2(H_2C{=}CH{-}CH_2{-}Cl) + NaOH \longrightarrow$

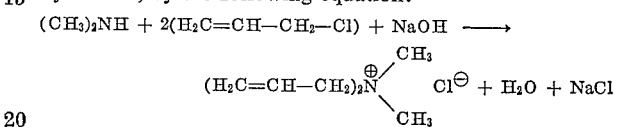

Formula I

To fully understand the reaction mechanism, it is necessary to break the reaction down into its three component steps in the synthesis of dimethyl diallyl ammonium chloride (referred to sometimes hereinafter as DMDAAC) from dimethyl amine, allyl chloride and an inorganic alkali. For ease of illustration, sodium hydroxide will be used as the inorganic alkali.

The first step is the addition of one-half mole of allyl chloride to one mole of dimethyl amine to form dimethylallyl amine and hydrogen chloride. The hydrogen chloride formed is immediately combined with the excess dimethyl amine to form the hydrochloride.

Step I

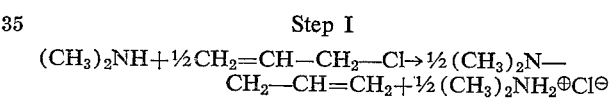

The second step is the liberation of the dimethyl amine from its hydrochloride by strong base so that the reaction can continue as in Step I.

Step II

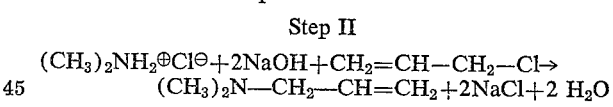

The third step is the addition of another mole of allyl chloride to the dimethylallyl amine to form dimethyldiallyl ammonium chloride.

Step III

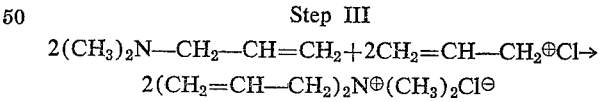

Because of the formation of dimethyl amine hydrochloride in Step I, that part of the reaction comes to a halt after one-half mole of allyl chloride has reacted. However, the reaction in Step III can continue, and in fact if a given amount of allyl chloride was added to dimethyl amine and the reaction allowed to stand for some time, one would then have an equilibrium mixture of dimethyl amine, dimethylamine hydrochloride, dimethylallyl amine, a trace of dimethylallyl amine hydrochloride, and dimethyldiallyl ammonium chloride. After all the allyl chloride was consumed, the reaction would come to a halt. If the above three steps were the only reactions involved, sodium hydroxide could be added to the equilibrium mixtures and the reaction would continue. However, it has unexpectedly been found that DMDAAC decomposes in a solution of pH of greater than 6.0 to yield a compound which is believed to be a terminal unsaturated aldehyde. While the present invention is not to be limited to the identification of any particular decomposition product, infrared spectra identification corresponds to such an aldehyde, and the decomposition product gives a positive Tollen's test and a 2,4 dinitrophenylhydazone which melts at 99° C. The aldehyde has not been recognized by the prior art, but is believed to impair the polymerization of DMDAAC to the desired high molecular weight polymers.

It has been found that the formation of this terminal unsaturated aldehyde can be minimized or prevented by keeping the concentration of the quaternary compound as low as possible during caustic addition, and maintaining a pH which is high enough to sustain the reaction but which will limit the destruction of the quaternary compound. Accordingly, the process of the present invention is directed to maintaining a low allyl chloride concentration and a high dimethyl amine concentration throughout the reaction, thereby taking advantage of the fact that the reaction rate of Step I is greater than that of Step III. In addition, it has been found that a pH in the range of about 12 to 14, and preferably a pH of about 13.5 allows a reasonable reaction rate with minimum aldehyde formation.

More specifically, in accordance with this technique, DMDAAC may be prepared from preferably about 2 to 2½ moles, most preferably 2¼ moles, of allyl chloride, and preferably about one mole of sodium hydroxide or other alkali per mole of dimethyl amine. An aqueous dimethylamine solution is cooled to a temperature of between 0 and 10° C., preferably between 0 and 5° C. A pH indicator is added to the dimethyl amine, which indicator should change color at a pH of about 12 to 14, preferably at a pH of 13 to 13.5. The preferred pH indicator is thymolphthalein. Of course, other means for detecting pH may be used besides indicators, e.g., pH electrodes may be used. Alternating or simultaneous small additions of allyl chloride and sodium hydroxide are then made to the dimethyl amine. While the sodium hydroxide may be of almost any concentration, for practical reasons, a concentration of 30–70%, and more preferably about 50%, is preferred.

While obviously very small amounts of allyl chloride may be added in each addition, it will be appreciated that extremely small additions will unduly prolong the reaction time and are therefore not desirable. Generally, additions in excess of 0.1 mole of allyl chloride per mole of dimetyhl amine should be avoided. Preferably, each addition of allyl chloride is an amount of about 0.01 mole per mole of dimethyl amine. If pH electrodes are used, it is possible to simultaneously add allyl chloride and sodium hydroxide in either a continuous or discontinuous manner as long as the pH stays within the indicated desired range.

When thymolphthalein is used as an indicator, each addition of allyl chloride will generally cause the blue color to disappear after a few minutes of stirring. The subsequent addition of sodium hydroxide should be in an amount sufficient to cause the blue color to reappear, generally with precipitation of sodium chloride. Thereafter, an additional amount of allyl chloride is added and then the pH is again raised by the addition of sodium hydroxide.

In any case, regardless of the method used to determine pH, the pH should be maintained within the range of 12 to 14, preferably 13 to 13.5, during the addition of the mole of sodium hydroxide and the first portion of the allyl chloride. This alternating addition of small amounts of allyl chloride and sodium hydroxide is repeated until a molecular equivalent of sodium hydroxide, and a first portion of about 1 to 1½ moles of allyl chloride, based on a mole of dimethyl amine, have been added.

The remaining allyl chloride, which generally amounts to slightly over one molecular equivalent, is slowly added over a period of time, e.g. 1 to 6 hours. The temperature of the reaction mixture during the addition of allyl chloride and sodium hydroxide should stay below 10° C. and preferably below 5° C. until all of the allyl chloride has been added. The temperature of the reaction mixture is then allowed to climb to refluxing conditions (e.g., 42–46° C.) and the mixture is refluxed gently at atmospheric conditions with brisk stirring maintained.

When the pH of the reaction mixture is approximately 7.0, the reaction exotherm will generally decrease to the point where refluxing will stop. The reaction mixture should then be heated at a temperature of about 42–46° C. until the pH reaches a value of 6.5 or below, preferably a value of about 6.0. The reaction mixture is then cooled and vacuum stripped to remove excess allyl chloride and untreated amine. The reaction mixture can be then treated, e.g., centrifuged or filtered, to remove sodium chloride. A subsequent activated charcoal treatment may be used if desired. A flow rate in a 15' activated charcoal column of 0.5 gal./hr./ft.sq. has been found to be satisfactory, for example.

The synthesis process will be further understood by reference to the following example; however, this example is intended to illustrate the invention and is not to be construed to limit the scope of the invention.

EXAMPLE

Dimethyl amine (1875 grams=25 moles) was placed in a reaction vessel and cooled to a temperature of 0° C. Thymolphthalein (0.1 gram) was added as an indicator (indicator pH range 13.0–13.5, colorless to blue). Allyl chloride (25 milliliters=.326 mole) was added and after three minutes the blue color disappeared. A 50% aqueous solution of sodium hydroxide was added until the blue color reappeared (the precipitation of sodium chloride was noted). An additional 25 milliliters of allyl chloride was added and the blue color faded. Additional sodium hydroxide was added, and this alternating addition of small amounts of allyl chloride and sodium hydroxide was repeated until 1000 grams (25 moles) of sodium hydroxide and a very slight excess over 25 moles of allyl chloride had been added. It has noted that toward the end of sodium hydroxide addition, the time required for the pH to change (i.e., for a color change) increased.

After all of the sodium hydroxide was added, the remaining allyl chloride was added over a time period of 2⅓ hours, giving a total addition of allyl chloride of 4303 grams (56.25 moles). The temperature during the addition of allyl chloride and sodium hydroxide was maintained below 10° C., until all of the allyl chloride has been added. The temperature of the reaction product was then allowed to rise to 45° C. and the mixture refluxed gently while brisk stirring was maintained. The reaction mixture at this point consisted of two phases, a top organic phase and a bottom aqueous phase.

After 6½ hours, the reaction exotherm began to decrease and the refluxing stopped. The pH at this point was approximately 7.0.

The reaction mixture was then heated at reflux conditions (45° C.) for ½ hour after which time the pH was 6.0. The reaction mixture was placed on a water aspirator for about 12 hours, and then vacuum stripped at a vacuum of 29" Hg. Then the reaction mixture was filtered, producing 1528 grams of salt. The filtrate was water-white, and by analysis contained 63% DMDAAC and 1% sodium chloride.

The dimethyl diallyl ammonium chloride produced by the synthesis process of the present invention may be used to produce high molecular weight homopolymers and copolymers of dimethyl diallyl ammonium chloride. The homopolymers and copolymers find utility in diverse liquid-solid separation processes, particularly those involving flocculation. For instance, copolymers of dimethyl diallyl ammonium chloride with other unsaturated monomers, such as, for example, acrylamide, acrylonitrile, acrylic acid, methyl methacrylate and the like, may be used as flocculants in water treatment. The homopolymers and copolymers may also be used in the preparation of dye-receptive fibers, and are of value as electroconductive coatings on paper and other substrates.

While sodium hydroxide is the preferred inorganic alkali, any alkali metal (e.g., potassium) hydroxide or carbonate may be used in the process of the present invention.

Obviously many modifications and variations of the present invention are possible in the light of the above teachings. It is therefore to be understood that the invention may be practiced otherwise than as specifically described.

What is claimed is:

1. A process for the synthesis of dimethyl diallyl ammonium chloride from dimethyl amine, allyl chloride and an inorganic alkali, comprising:
   (a) cooling dimethyl amine to be a temperature of about 0° to about 10° C.,
   (b) adding small portions of allyl chloride and of inorganic alkali to said dimethyl amine while,
      (i) maintaining a temperature of less than about 10° C., and
      (ii) maintaining the pH of the dimethyl amine mixture within the range of about 12 to 14
   until from about 0.8 to 1 mole of the alkali and from about 1 to about 1½ moles of allyl chloride per mole of dimethyl amine have been added,
   (c) thereafter adding to the mixture a further amount of allyl chloride such that the total allyl chloride amount added in steps (b) and (c) is about 2 to 2½ moles per mole of dimethyl amine, while
      (i) maintaining a temperature of less than 10° C.,
   (d) and thereafter subjecting the reaction mixture to refluxing conditions at substantially atmospheric conditions for a time sufficient to lower the pH of the mixture to a level less than about 6.5
   whereby dimethyl diallyl ammonium chloride of improved purity is produced.

2. The process as claimed in claim 1 wherein the pH of the mixture during the addition of allyl chloride and inorganic alkali in step (b) within the range of 13 to 13.5.

3. The process as claimed in claim 1 wherein said inorganic alkali is sodium hydroxide.

4. The process as claimed in claim 1 wherein each addition of allyl chloride to dimethyl amine in step (b) is less than 0.1 mole of allyl chloride per mole of dimethyl amine.

5. The process as claimed in claim 1 wherein about 1 mole of inorganic alkali is added to the dimethyl amine in step (b).

6. The process as claimed in claim 1 wherein the total allyl chloride addition is about 2¼ moles per mole of dimethyl amine.

7. The process as claimed in claim 1 wherein the refluxing conditions in step (d) are maintained until the mixture pH is 6.0 or less.

8. The process as claimed in claim 1 wherein said refluxing conditions including maintaining the reaction mixture at a temperature of about 42 to about 46° C.

9. A process for the synthesis of dimethyl diallyl ammonium chloride, from dimethyl amine, allyl chloride, and an inorganic alkali, said process comprising:
   (a) cooling dimethyl amine to a temperature of about 0° C. to about 10° C.,
   (b) simultaneaously and continuously adding allyl cloride and inorganic alkali to said dimethyl amine while,
      (i) maintaining the reaction mixture temperature at less than 10° C., and
      (ii) maintaining the pH of the reaction mixture within the range of about 12 to 14
   until a reaction mixture containing 0.8 to 1 mole of alkali and from about 1 to about 1½ moles of allyl chloride per mole of dimethyl amine is obtained,
   (c) thereafter, adding to the mixture an amount of allyl chloride such as to bring the total allyl chloride addition to 2 to 2½ moles per mole of dimethyl amine while,
      (i) maintaining a temperature of less than 10° C.,
   (d) and thereafter maintaining a refluxing temperature of the mixture until the pH of the mixture is less than 6.5,
   whereby dimethyl diallyl ammonium chloride of improved purity is produced.

10. The process as claimed in claim 9 wherein the pH of the mixture during the addition of allyl chloride and inorganic alkali in step (b) within the range of 13 to 13.5.

11. The process as claimed in claim 9 wherein said inorganic alkali is sodium hydroxide.

12. The process as claimed in claim 9 wherein about 1 mole of inorganic alkali is added to the dimethyl amine in step (b).

13. The process as claimed in claim 9 wherein the total allyl chloride addition is about 2¼ moles per mole of dimethyl amine.

14. The process as claimed in claim 9 wherein the refluxing conditions in step (d) are maintained until the mixture pH is 6.0 or less.

15. The process as claimed in claim 9 wherein said refluxing conditions including maintaining the reaction mixture at a temperature of about 42 to about 46° C.

References Cited

UNITED STATES PATENTS 3,165,465   1/1965   Ray et al.

CHARLES B. PARKER, Primary Examiner

S. T. LAWRENCE III, Assistant Examiner

U.S. Cl. X.R.

117—201; 210—54; 260—80, 85, 86, 89, 601